US005723867A

United States Patent [19]

Imura

[11] Patent Number: 5,723,867
[45] Date of Patent: Mar. 3, 1998

[54] FIELD EMISSION CATHODE HAVING FOCUSING ELECTRODE

[75] Inventor: Hironori Imura, Tokyo, Japan

[73] Assignee: NEC Corporation, Tokyo, Japan

[21] Appl. No.: 607,463

[22] Filed: Feb. 27, 1996

[30] Foreign Application Priority Data

Feb. 27, 1995 [JP] Japan .................................... 7-038234

[51] Int. Cl.[6] ................................ G01N 27/00; H01J 1/02
[52] U.S. Cl. ........................................ 250/423 F; 313/309
[58] Field of Search .......................... 250/423 F; 313/309, 313/351

[56] References Cited

U.S. PATENT DOCUMENTS

| | | | |
|---|---|---|---|
| 4,663,559 | 5/1987 | Christensen | 250/423 F |
| 5,030,895 | 7/1991 | Gray | 315/350 |
| 5,191,127 | 3/1993 | Babler | 568/591 |
| 5,191,217 | 3/1993 | Kane et al. | 250/423 F |
| 5,229,682 | 7/1993 | Komatsu | 313/309 |
| 5,493,173 | 2/1996 | Imura | 313/306 |
| 5,514,847 | 5/1996 | Makishima et al. | 313/309 |
| 5,543,680 | 8/1996 | Tomihari | 313/336 |

FOREIGN PATENT DOCUMENTS 5-343000 12/1993 Japan .

OTHER PUBLICATIONS

A.S. Gilmour, Jr., "Microwave Tubes", Artech House, pp. 141–143, 1986.

*Primary Examiner*—Bruce Anderson
*Attorney, Agent, or Firm*—Sughrue, Mion, Zinn, Macpeak & Seas, PLLC

[57] ABSTRACT

In a field emission cathode, periphery portions of opening portions of a gate electrode are recessed on a side of a substrate, and a focusing electrode having opening portions which are identical in number with the opening portions of the gate electrode are disposed on the gate electrode. Further, a shield electrode having opening portions which are identical in number with opening portions of the gate electrode are disposed between the gate electrode and the focusing electrode. According to the above-mentioned construction, a focusing aberration can be reduced, and a focused electron flow can be obtained by a low electric potential of the gate electrode.

7 Claims, 2 Drawing Sheets

FIELD EMISSION CATHODE HAVING FOCUSING ELECTRODE

BACKGROUND OF THE INVENTION

1. Field of the Invention

The present invention relates to a cold cathode as an electron emitting source, more particularly to a field emission cathode with a focusing electrode for emitting electrons from a sharp-pointed leading end thereof.

2. Description of the Related Art

A field emission cathode is known in the art. It is also known that electrons emitted from the field emission cathode have a divergence angle of a half angle 30°. Therefore, in a case where the field emission cathode is applied to the electron gun, a flow of the electrons (hereinafter referred to as the electron flow) should be made in a controlled condition every application example on which the cold cathode is mounted actually. That is, the electron flow should be controlled to be in a parallel flow in a case where the cathode is applied to the traveling-wave tube, the electron flow should be converged at a predetermined space in a case where the cold cathode is applied to the CRT. Moreover, there should be worked out the countermeasure that the electron flow exerts a negative influence to the adjacent pixel. It is important how to constitute the focusing electrode for controlling the emitted electron flow.

For example, there is proposed an electron gun provided with a pair of focusing electrodes on a front of an electron emitting surface of the field emission cathode, in the Japanese Unexamined Patent Publication No. 5-343000 (FIG. 1). In this example, a first electron beam focusing electrode 101 and a second electron beam focusing electrode 102 are arranged on a front of an electron emission surface and supported by a peripheral construction of a substrate 1. An electron lens is formed between the first electron beam focusing electrode 101 and the second electron beam focusing electrode 102 by applying a optimum potential to these electron beam focusing electrodes. Accordingly, the electron flows emitted from the emitter cones 9 are run in parallel among each other or focused at a predetermined space, in response to the purpose.

Further, in the U.S. Pat. No. 5,191,217 issued on Mar. 2, 1993, there is disclosed a field emission cathode having a focusing electrode which forms an integral part of the cathode as shown in FIG. 2. In this example, the focusing electrode 8 has an opening portion which is coaxial with an opening portion of the gate electrode 6, a convex electron lens is formed on a leading end of the emitter cone by applying a potential lower than that of the gate electrode 6 to the focusing electrode 8.

In a case where the divergent electron flow is focused, the problem resides in that "the product of an angle (the divergence angle) at which the electron flow is emitted and a sectional area of the electron flow is always conserved". That is, in a case where the electron flow having a predetermined divergence angle is focused by the electron lens which uses the focusing electrode, etc., the divergence angle becomes too large according to the amount of the focused electron flow. For example, in a case where the cold cathode is applied to the CRT, since path distances of the electron flow are different depending on a center of the screen or a periphery of the screen, it becomes difficult to focus the beam over all the screen if the strength of the electron lens is made too weak.

Further, in the conventional hot cathode, the initial speed of the emitted electron which is questioned here is substantially 0 eV in a case where the thermionic energy is ignored, the electrons are taken out into the vacuum by the potential distribution applied to the focusing electrode, and focused thereinto. That is, the lateral direction component of the divergent angle is only the amount of the thermionic energy due to the heating of the cathode in the conventional hot cathode.

On the other hand, in the field emission cold cathode, a strong electric field is caused at the leading end of the emitter cone due to the potential exhibited when the electrons are applied to the gate electrode, which is emitted into the vacuum with the above-mentioned divergence angle due to the tunnel phenomenon, and the electron flows are accelerated according to the value of the applied voltage to the electrode.

That is, there is a drawback that the electron flow emitted from the field emission cathode is hard to focus since it has the initial speed and the divergence angle when the electrons pass through the gate electrode before they are influenced by the electron lens caused by the focusing electrode.

Moreover, the electron flow from the field emission cathode having the above initial speed and the above divergence angle is focused, after the electron flow is emitted from the emitter cone 6, by the focusing electrode arranged apart from the emitter cone 6, as shown in FIG. 1, so that there is caused a problem of the color aberration in the optical lens system. That is, there is caused a problem that the focusing point of the electrons passing through the vicinity of the center portion of the electron flow and the focusing point of the electrons passing through the outer peripheral portion of the electron flow do not coincide with each other.

Therefore, in order to dissolve the problem of the aberration, it is necessary that the divergence angles of the electrons emitted from the emitter cones are reduced, or controlled in the vicinity of the emitter cone.

In FIG. 2, it is considered that a method of arranging the focusing electrode 8 every emitter cone 9 is effective. In the field emission cathode having an integrally formed focusing electrode 8 shown in FIG. 2, the electric potential lower than that of the gate electrode 6 is applied to the focusing electrode 8.

However, in the field emission cathode shown in FIG. 2, there is a drawback that the electron flow is focused, and the quantity of the electric current emitted from the emitter cone 9 is reduced.

In FIG. 3, there is shown by using equipotential lines 14 respective behaviors of the electric field in the vicinity of the leading end of the emitter cone 9 exhibited in case of the field emission cathode with the focusing electrode 8 and in case of the field emission cathode without the focusing electrode 8. In FIG. 3, the left side of the drawing shows the case where the cathode has not the focusing electrode, and the right side of the drawing shows the case where the cathode has the focusing electrode.

As shown in the right side of FIG. 3, the equipotential lines 14 extending from the second insulating layer 7 is shaped in a convex downward above the emitter cone 9. The downward convex equipotential lines 14 shows that the electron lens for focusing the electrons emitted from the emitter cone 9 are formed.

On the other hand, on a part of the equipotential lines extending from the insulating layer 4 extends to a side of the second insulating layer 7 not to a side of the emitter cone 9. This means that the electric field formed between the gate electrode 6 and the focusing electrode 8 controls excessively the strong electric field on the leading end of the emitter cone 9 applied between the gate electrode 6 and the substrate 1. That is, if the electric potential lower than that of the gate electrode 6 is applied to the focusing electrode 8, the emitted electrons are focused, however, there is a drawback that only a small quantity of the emitted current can be obtained when the electric potential of the gate electrode 6 is equivalent to that exhibited in a case where the cold cathode has not the focusing electrode 8.

SUMMARY OF THE INVENTION

It is therefore an object of the present invention to provide a field emission cathode which can reduce a focusing aberration, and a focused electron flow can be obtained by a low electric potential of a gate electrode.

According to the present invention, an opening portion of a gate electrode is recessed on a side of a substrate in a cone-shape, and a focusing electrode having an opening portion which coincides, respectively, in central axis with opening portion of the gate electrode is arranged so as to be opposed to the gate electrode on the substrate, and an insulating layer is arranged between the gate electrode and the focusing electrode.

An opening portion of a gate electrode is recessed on a side of a substrate in a cone-shape, and a focusing electrode having an opening portion which coincide, respectively, in central axes with opening portion of the gate electrode is arranged so as to be opposed to the gate electrode on the substrate, and a shield electrode having an opening portion which coincides, respectively, in central axis with the opening portion of the gate electrode is arranged between the gate electrode and the focusing electrode.

The electric potential of the focusing electrode is applied in a positive side to the electric potential of the gate electrode.

The opening portion of the gate electrode is recessed on a side of the substrate, and the focusing electrode having the opening portion every field emission cathode is formed at a close position on the field emission cathode, so that a strong electron lens is formed every leading end of the emitter cone is formed, then the electron beam having a small divergence angle and a little aberration can be obtained.

Moreover, the leading end of the emitter cone is hard to be influenced by the electric field generated between the focusing electrode and the gate electrode, and the electrons can be taken out at a low electric potential of the gate electrode.

Furthermore, the field emission cathode can be operated without controlling the quantity of the emission by applying to the focusing electrode the electric potential higher than that of the gate electrode.

DESCRIPTION OF THE PREFERRED EMBODIMENTS

Figure 4:
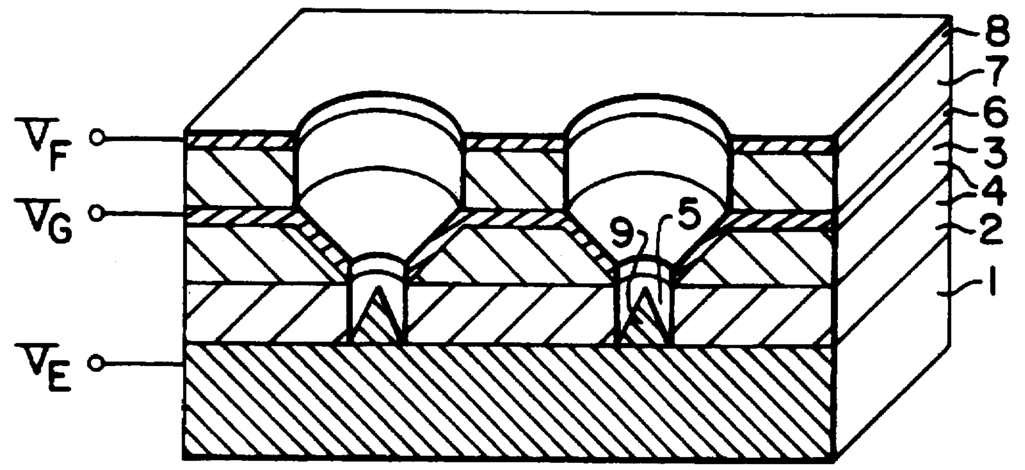
FIG. 4 is a perspective sectional view of a field emission cathode of a first embodiment of according to the present invention.

Referring to FIG. 4 the first insulating member 4 is formed on a substrate 1. The first insulating member 4 is made of two insulating layers 2 and 3 which have different etching ratio therebetween. Specifically, a silicon dioxide layer 2 is formed on a substrate of a single crystal silicone by using a thermal oxidation method.

On the silicone dioxide layer 2 is formed a silicon nitride layer 3 by using a CVD method. Each thickness of the silicone dioxide layer 2 and the nitrogen dioxide layer 3 is 1 μm.

Next, by using the photo-lithography technique, a region except the region at which a cavity 5 is formed is masked by a photoresist (not shown), then the silicon nitride layer 3 provided with a hole having a side surface which is inclined in such a manner that a hole diameter becomes small toward the substrate 1 by wet etching technique, jointly usage of reactive ion etching (RIE) and wet etching technique, and an optimization of the etching condition of RIE. The hole diameter of the silicon nitrogen membrane 3 is 1.5 μm at a surface thereof contacting to the silicone dioxide 2, and 3 μm at the opening portion thereof.

A gate electrode 6 made of a high melting point metal of 0.3 μm in thickness, such as tungsten silicide (WSi), molybdenum, tungsten, etc., is formed on the insulating layer 4.

The foregoing process may be replaced by the process disclosed in the U.S. Pat. No. 5,493,173 issued on Feb. 20, 1996.

Further, a second insulating layer 7 of 1 μm in thickness made of silicone oxide is made on a gate electrode 6 by using CVD method. On the second insulating layer 7 is formed a focusing electrode 8 made of a high melting point metal such as tungsten silicide (WSi), molybdenum, tungsten, etc., by using sputtering method.

After forming the focusing electrode 8, similarly to the above-mentioned conventional method of producing the field emission cathode, the cavity 5 is formed by photo-lighograph technique and, dry etching technique such as RIE, and an emitter cone 9 is formed by subjecting to a conventional process such as vapor deposition method and the sacrifice layer etching.

The holes of the focusing electrode 8 and the second insulating layer 7 is formed by isotropic etching at the time of dry etching of RIE, so that the hole diameter is made 3 μm. Further, the opening diameter of the gate electrode 6 is 1.5 μm.

When about 30 V is applied to the gate electrode 6, the electron emission of $1\times10^{-12}$ A per one emitter cone is realized. A desired emission electric current can be obtained by increasing the applied voltage. For example, in a case where the applied voltage to the gate electrode 6 is made 60 to 80 V, the emission electric current of 1 mA is obtained of $1\times10^{-7}$ A per one emission cone, 1 mA per 10000 elements.

To the focusing electrode 8, either one of higher or lower electric potential than the gate voltage $V_G$ can be applied.

In a case where the higher focusing voltage $V_F$ is applied to the focusing electrode 8, for example, in a case where the electric potential ($V_E$) of the substrate is 0 V, the electric potential ($V_G$) of the gate electrode is 80 V, and the electric potential ($V_F$) of the focusing electrode is 200 V, the divergence angle is 10° which corresponds to ⅓ of the divergence angle exhibited when there is not the focusing electrode, without reducing the quantity of the emitted electric current. Further, if the voltage of the gate electrode is further reduced, the divergence angle becomes small.

This means that the equipotential plane is formed along the recessed gate electrode by recessing the gate electrode in a cone-shape, so that the electron lens is formed. Further, this electron lens can be formed due to the addition of the low electric potential stronger than that of the conventional electric field emission cathode without focusing electrode, since the electron lens is formed between the gate electrode and the focusing electrode which are close to each other.

Figure 1:
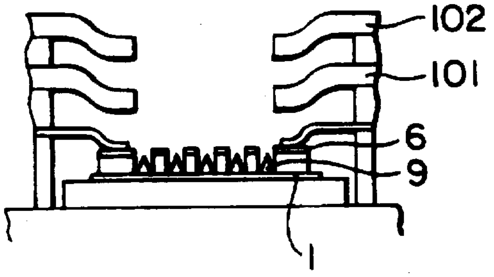
FIG. 1 PRIOR ART
FIG. 1 is a sectional view of an electron gun to which an electric field emission type cold cathode disclosed in the Japanese Unexamined Patent Publication No. 5-343000 is applied.
Figure 2:
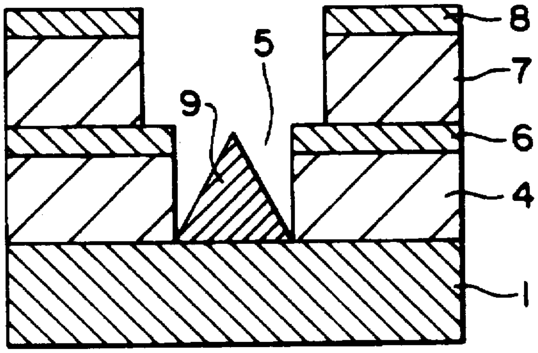
FIG. 2 PRIOR ART
FIG. 2 is a sectional view of an electric field emission type cold cathode disclosed in the U.S. Pat. No. 5,191,217.
Figure 3:
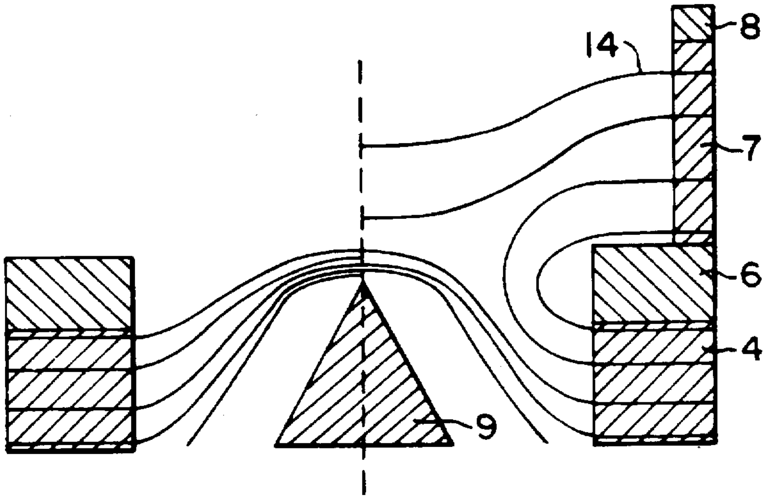
FIG. 3 PRIOR ART
FIG. 3 is a diagrammatical view showing an electric field distribution in the vicinity of the leading end of the emitter cone in case of the electric field emission type cold cathode with the focusing electrode and in case of the said cold cathode without the focusing electrode.

On the other hand, even in a case where a lower electric potential than the gate voltage is applied to the focusing electrode 8, the emitted electrons can be focused in a condition that the electric potential difference between the focusing electrode and the gate electrode is small, as compared with an field emission cathode with a parallel flat plate type focusing electrode shown in FIG. 2. This means that the electron flow having the desired electric current value and degree of focusing can be obtained without degrading the electron emitting characteristic of the field emission cathode shown in FIG. 3. That is, the electron lens effect is realized by the gate electrode 6 and the focusing electrode 8 in the prior art shown in FIG. 2, however, in this case, the electron lens effect realized by recessing the gate electrode 6 in a cone-shape on a side of the substrate is added to the electron lens effect realized by the gate electrode 6 and the focusing electrode 8. Therefore, the electric potential applied to the focusing electrode 8 need not be lowered according to the electron lens effect realized by recessing the gate electrode 6 in a cone-shape on the side of the substrate, so that the control of the emitted electrons due to the focusing electrode is reduced.

Figure 5:
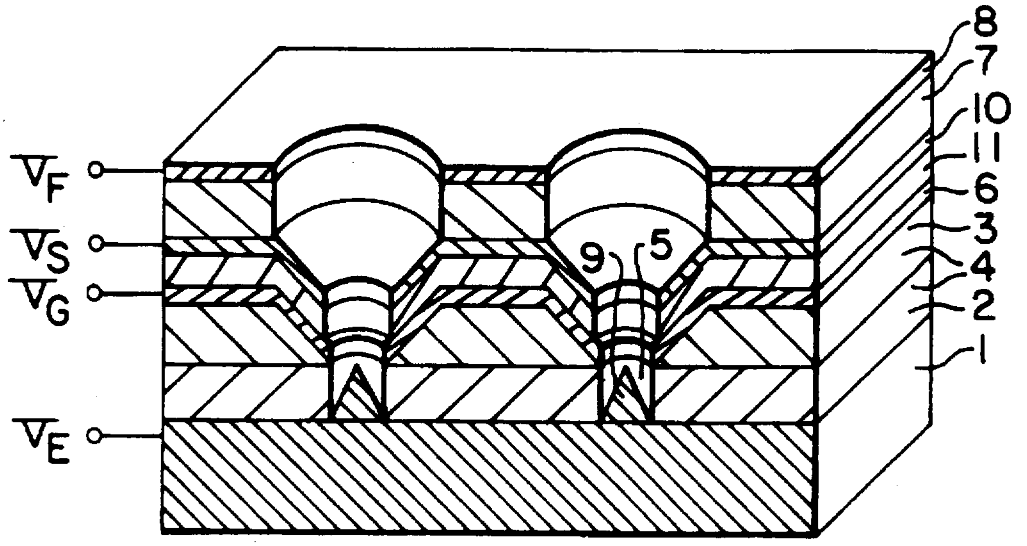
FIG. 5 is a perspective sectional view of a field emission cathode of a second embodiment of according to the present invention.

FIG. 5 is a perspective sectional view of a second embodiment of the field emission cathode according to the invention. In this embodiment, a shield electrode 10 and a third insulating layer 11 are sandwiched between the gate electrode 6 and the second insulating layer 7 in the field emission cathode of the first embodiment.

The shield electrode 10 is made of a high melting point metal of 0.3 μm in thickness, such as tungsten silicide (WSi), molybdenum, tungsten, etc., formed by using sputtering method. Further, the third insulating layer 11 is 0.5 μm in thickness, and is made of silicone oxide formed by using CVD method. The shield layer 10 and the third insulating layer 11 are formed on the layer of the gate electrode 6 made by the sputtering in the producing process of the first embodiment. The shield electrode 10 is side-etched by the dry etching at the time of the forming of the opening portion of the gate electrode 6, the opening diameter of the shield electrode 10 is 1.6 μm, as compared with that the opening diameter of the gate electrode 6 is 1.5 μm, The voltage applied to the gate electrode 6 and the focusing electrode 8 is similar to that of the field emission cathode of the first embodiment. Further, to the shield electrode 10 is applied the same electric potential ($V_S$) as that of the gate electrode 6 or the intermediate electric potential of the gate electrode 6 and the focusing electrode 8. Preferably, the intermediate potential is about 10 V higher than the gate voltage $V_G$.

Incidentally, the above-mentioned respective materials, and numerals of sizes and the applied voltages, etc., in the field emission cathode of the embodiments according to the invention are merely cited as instances of numerous cases, which do not restrict the invention.

As described above, the following three advantages are obtained by recessing the gate electrode 6 on the side of the substrate 1.

First, the electron lens can be realized only by recessing the gate electrode 6. Therefore, as described above, the focusing of the electron flow to some extent can be obtained without applying the positive electric potential to the gate electrode 6 to control the emission of the electrons, then this can be used as a desired electron source in response to the actually mounting method and the application example.

Next, in a case where the electron lens is realized by applying the low electric potential lower than that of the gate electrode 6 to the focusing electrode 8, the influence of the focusing electrode to the leading end of the emitter cone 9 is decreased, then the emitted quantity of the electric current can be prevented from lowering. When the shield electrode 10 of the second embodiment is provided, the advantage thereof is obtained more remarkably.

Furthermore, according to the construction which is bent in a direction in which the gate electrode 6 is separated therefrom when viewed from the focusing electrode 8, there is caused an advantage that the electric field realized between the gate electrode 6 and the substrate 1 decreases the influence of the electric field due to the application of the focusing electrode 8.

As described above, in the field emission cathode according to the invention, the focusing aberration can be reduced, and the focused electron flow can be obtained by the low electric potential of the gate electrode 6.

I claim:

1. A field emission cathode comprising:

a substrate having an electrically-conductive surface;

a first insulating layer disposed on said electrically-conductive surface of said substrate, said first insulating layer having a cavity defined by a cavity edge formed therein;

a second insulating layer disposed on said first insulating layer, said second insulating layer being recessed at a downward inclination around said cavity edge;

a gate electrode disposed on said second insulating layer adjacent said cavity edge, said gate electrode being recessed at a downward inclination around and in contact with said second insulating layer at said cavity edge;

a third insulating layer disposed on said gate electrode except for said recessed portion;

a focusing electrode disposed on said third insulating layer; and an emitter disposed in said cavity, said emitter being electrically connected to said electrically conductive surface of said substrate.

2. A field emission cathode according to claim 1, further comprising a shield electrode and a fourth insulating layer disposed between said gate electrode and said third insulating layer.

3. A field emission cathode according to claim 1, wherein an electric potential applied to said focusing electrode is higher than an electric potential applied to said gate electrode.

4. A field emission cathode according to claim 1, wherein said recessed portion of the gate electrode is shaped in a cone.

5. A field emission cathode comprising:

a substrate having an electrically-conductive surface;

a first insulating layer disposed on said electrically-conductive surface of said substrate, said first insulating layer having a cylindrical cavity defined by a cavity edge formed therein;

a gate electrode disposed on said first insulating layer adjacent said cavity edge, said gate electrode being recessed around said cavity edge;

a second insulating layer disposed on said gate electrode except for said recessed portion;

a shield electrode disposed on said second insulating layer;

a third insulating layer disposed on said shield electrode;

a focusing electrode disposed on said third insulating layer; and an emitter disposed in said cavity, said emitter being electrically connected to said electrically conductive surface of said substrate.

6. The field emission cathode according to claim 5 wherein an electric potential applied to said focusing electrode is higher than an electric potential applied to said gate electrode.

7. The field emission cathode according to claim 5 wherein said recessed portion of said gate electrode is shaped in a cone.

* * * * *